United States Patent [19]

Harrow et al.

[11] 3,927,651

[45] Dec. 23, 1975

[54] DEVICE FOR VAPORIZING FUEL

[75] Inventors: Geoffrey A. Harrow, Wirral, England; Walter D. Mills, Mold, North Wales

[73] Assignee: Shell Oil Company, Houston, Tex.

[22] Filed: Jan. 13, 1975

[21] Appl. No.: 540,484

[30] Foreign Application Priority Data
Jan. 23, 1974 United Kingdom............... 3171/74

[52] U.S. Cl............. 123/122 A; 123/122 E; 123/133; 165/105
[51] Int. Cl.²......................................... F02M 31/00
[58] Field of Search..... 123/122 AA, 122 A, 122 E, 123/133; 165/105, 32

[56] References Cited
UNITED STATES PATENTS
3,682,237  8/1972  Islo .................................. 165/105
3,749,158  7/1973  Szabo................................ 165/105
3,763,838  10/1973  Lindsay et al. ................. 123/122 A Primary Examiner—Charles J. Myhre
Assistant Examiner—R. H. Lazarus
Attorney, Agent, or Firm—Ronald R. Reper

[57] ABSTRACT

A device for vaporizing liquid fuel comprising a sealed vessel containing a heat transfer fluid and a noncondensable gas having a heat receiving zone, a heat discharging zone and a heat transfer liquid storage zone in which all the contained condensed heat transfer fluid can be stored without being returned directly to the heat receiving zone, said storage zone communicating with said heat receiving zone and/or said heat exchanging zone.

7 Claims, 3 Drawing Figures

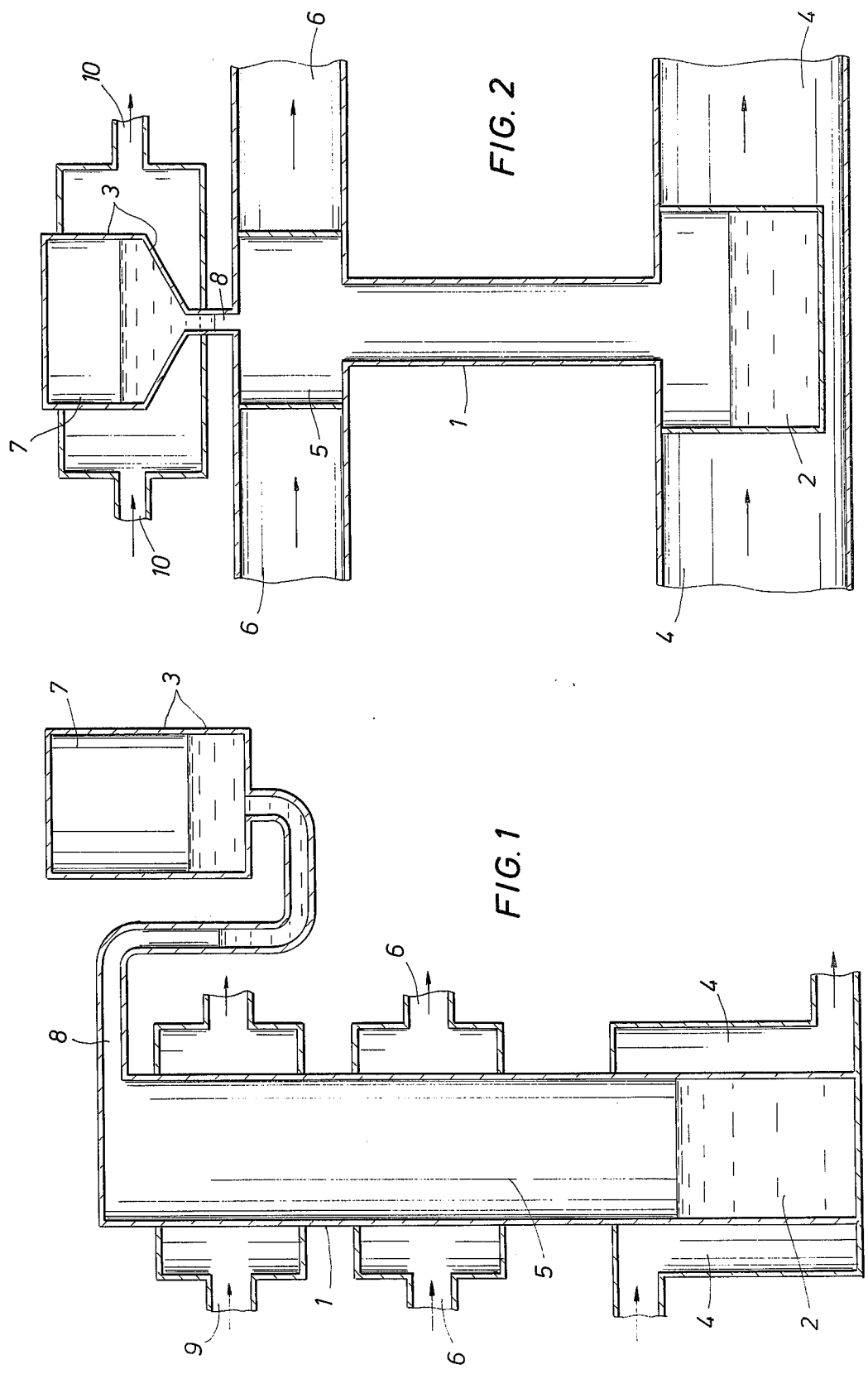

DEVICE FOR VAPORIZING FUEL

Related is U.S. patent application Ser. No. 505,197 filed Sept. 11, 1974, incorporated herein by reference.

BACKGROUND OF THE INVENTION

This invention relates to a devise for vaporizing liquid fuel prior to its introduction into the combustion chambers of an internal combustion engine or a gas turbine.

The conventional spark-ignition gasoline engine relies on a carburetor to mix a desired proportion of a volatile fuel with the inlet air. For complete combustion of the fuel/air mixture the fuel needs to be uniformly dispersed in the air. Such a uniform mixture is seldom if ever obtained in practice with a conventional carburetor, and manifold fuel injection offers only marginal improvement. In the conventional gas turbine a uniform fuel/air mixture is equally hard to achieve.

It has been proposed to vaporize the fuel prior to its introduction into a combustion chamber and prior to or after mixing it with the main stream of combustion air, with heat derived from the exhaust system, this heat being transported with the aid of a heat transfer fluid present in one or more so-called heat pipes, each of which is in the form of a substantially closed (e.g. sealed) vessel containing a heat transfer fluid and so constructed that in operation the heat transfer fluid in the said heat pipe or heat pipes is evaporated in the so-called heat receiving zone of the heat pipe by heat received from the exhaust gases of the said engine, and condensation of the said evaporated heat transfer fluid taking place by discharging heat for the evaporation of fuel to be combusted in the so-called fuel vaporizing zone of the heat pipe.

The use of vaporized fuel enables a gasoline engine to be run on such lean mixtures, even in excess of 20:1 air/fuel ratio, that the levels of carbon monoxide and oxides of nitrogen are simultaneously low, which contributes to the abatement of environmental pollution.

The amount of heat transfer fluid that should be present in the heat pipe is related to the amount of fuel to be evaporated during running of the engine and it must in all cases, even at high load and high speed, be sufficient to be able to transport the required amount of heat to evaporate the fuel from the heat-receiving zone of the heat pipe to the fuel vaporizing zone of the heat pipe. In case of low load and/or low speed the amount of heat supplied to the heat transfer fluid by the exhaust system in the heat-receiving zone of the heat pipe may become considerably higher than the amount of heat removed from the said fluid in the heat-discharging zone, and as a result pressure and temperature in the heat pipe will increase unless special measures are taken. The increase of pressure is unattractive because the heat pipe must be able to withstand high pressures, while the increase in temperature is disadvantageous because a fairly constant temperature of the heat-discharging zone is desired in most cases.

It has been proposed to have available in the heat pipe, besides the heat-discharging zone, additional cooling means in order to remove excess heat from the heat transfer fluid by condensing excess vapor of the heat transfer fluid. Although in such a way a satisfactory control of pressure and temperature in the heat pipe can be achieved, the additional cooling means require a separate cooling system which is costly and requires complicated engineering.

A method for control of the temperature and pressure in a heat pipe has now been found, which is not based on removal of excess heat from the heat transfer fluid, and for which accordingly no additional cooling means are necessary in the heat pipe.

SUMMARY OF THE INVENTION

The invention provides a system in which the amount of heat transfer fluid used for the transport of heat from the heat-receiving zone to the heat-discharging zone is automatically adapted at any moment to the amount of heat to be transported.

Accordingly there is provided a device for vaporizing liquid fuel prior to its introduction into the combustion chamber of an internal combustion engine or a gas turbine which comprises a heat pipe which is in the form of a sealed vessel containing a heat transfer fluid comprising a vaporizable liquid having a boiling point at atmospheric pressure up to 400°C and a non-condensable gas, which heat pipe comprises:

a. a heat receiving zone operatively engaging the exhaust system of said engine or gas turbine, for heating the heat transfer fluid and vaporizing said liquid with the heat from said exhaust system, b. a heat-discharging zone operatively engaging the fuel inlet of said engine or gas turbine for cooling and condensing the heat transfer liquid by transference of heat to said fuel to be evaporated, said heat discharging zone communicating with said heat receiving zone whereby condensed heat transfer liquid is directly returned to said heat receiving zone, and c. at least one heat transfer liquid storage zone in communication with the heat receiving zone or the heat discharge zone for storage of the heat transfer liquid and wherein the capacity of said storage zone is sufficient to store all of the heat transfer liquid and a portion of the non-condensable gas present in the device.

BRIEF DESCRIPTION OF THE DRAWINGS

FIG. 1 is a schematic diagram of one embodiment of the invention.

FIG. 2 is a schematic diagram of another embodiment of the invetion.

DESCRIPTION OF PREFERRED EMBODIMENTS

Figure 3:
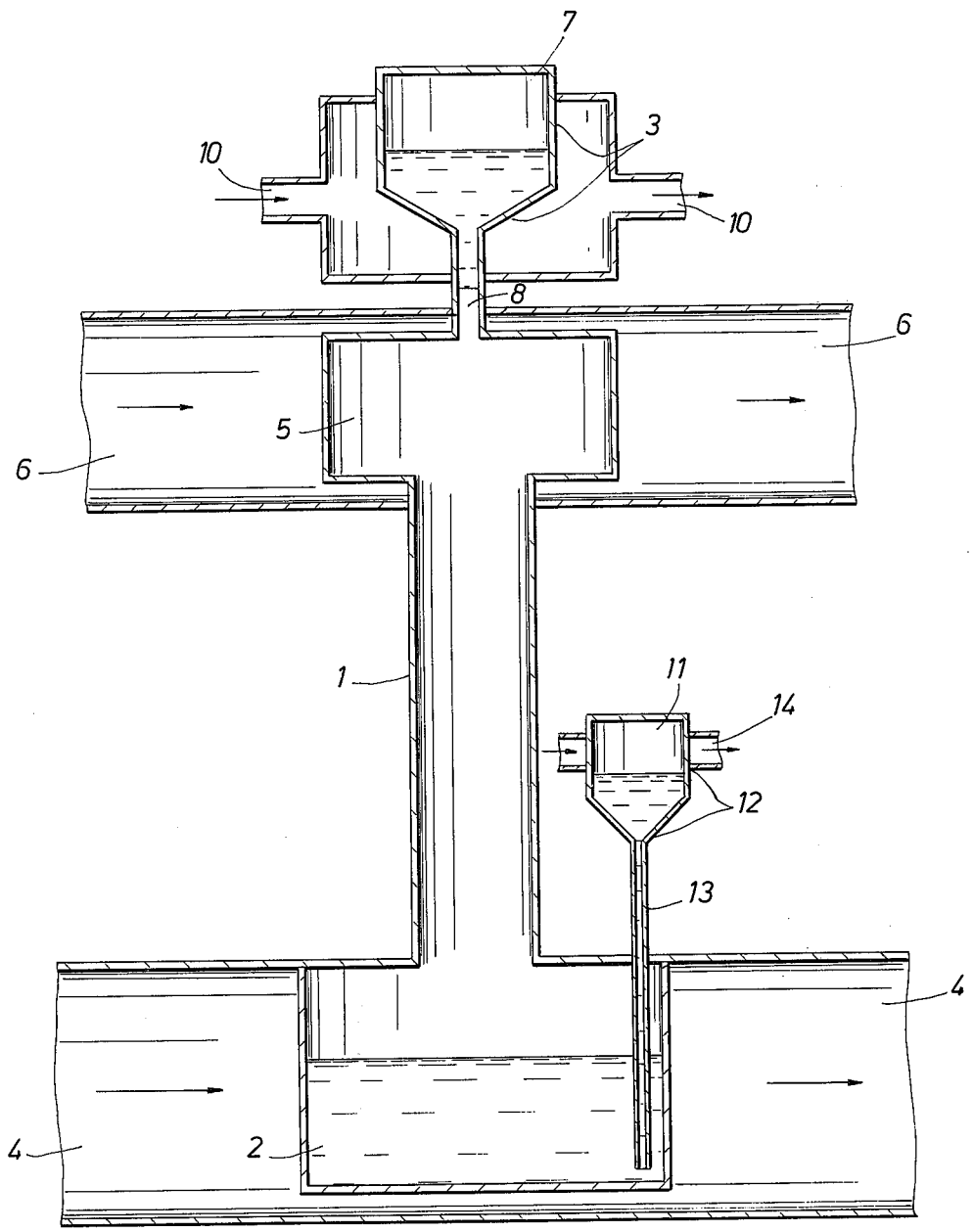
FIG. 3 is a schematic diagram of yet another embodiment of the invention employing a plurality of heat discharge zones.

The amount of heat transfer liquid in the heat-receiving zone of the heat pipe exerts a decisive influence on the amount of heat that can be transported to the heat-discharging zone of the heat pipe. In case the said amount of heat transfer liquid decreases the surface of the heat transfer said amount of heat transfer liquid decreases the surface of the heat transfer liquid which is in contact with the heating source of the heat-receiving zone of the heat pipe will decrease, and accordingly less heat will be taken up per unit of time by the heat transfer liquid and consequently less heat will be transported.

According to the invention the size of the heat transfer liquid storage zone is such that all of the heat transfer liquid and a portion of the non-condensable gas present in the heat pipe can be stored in the said zone. In this way transport of heat from the heat-receiving zone to the heat-discharging zone can be restricted to essentially none, or only very small amounts, if needed at normal engine operating temperature.

The amount of heat to be transported will be a function of the amount of heat to be discharged to the heat-discharging zone of the heat pipe and this amount may vary with the amount of fuel to be evaporated per unit of time, its composition and its temperature.

If needed heat transfer fluid will be removed from the heat pipe proper with the device according to the invention and will be stored in the liquid phase in the heat transfer liquid storage zone from which it is not returned directly to the heat-receiving zone. The amount of heat transfer fluid that is removed from the heat pipe proper will depend on the amount of heat which is to be transported from the heat-receiving zone to the heat-discharging zone of the heat pipe. The term "heat pipe proper" herein refers to that part of the heat pipe which comprises the heat-receiving zone, the heat-discharging zone, the tubing between these zones, and, if present, additional cooling means from which condensed heat transfer liquid is directly transported to the heat-receiving zone, e.g. by gravitational force, but not the heat transfer liquid storage zone.

The heat transfer liquid storage zone may be connected from the lower part of said storage zone to the heat pipe proper by any type of conduit provided this conduit is constructed in such a way that untimely flowing back of heat transfer fluid from the heat transfer liquid storage zone to the heat pipe proper is avoided. In most cases a tube which ends near the bottom part of the heat transfer liquid storage zone is very suitable. In case the heat transfer liquid storage zone is on top of the heat pipe proper a capillary conduit may be used with advantage.

From the heat transfer liquid storage zone (which zone preferably is in poor thermal contact with the heat-receiving zone and the heat-discharging zone of the heat pipe) heat transfer fluid, in general in the liquid phase, can be transported back to the heat-receiving zone of the heat pipe, which back-transportation will be so controlled that the amount of heat transfer liquid needed for the required heat transportation from the heat-receiving zone to the heat-discharging zone will be present in the heat-receiving zone.

In case the amount of heat to be transported from the heat-receiving zone to the heat-discharging zone will decrease, less heat transfer fluid in the gaseous phase will condense in the heat-discharging zone, and accordingly the pressure in the heat pipe will increase. Heat transfer fluid will be removed from the heat pipe proper and enter the heat transfer liquid storage zone, and be stored there in the liquid phase (in case it enters in the gaseous form after condensation). Non-condensable gas will be accumulated on top of the heat transfer fluid in the liquid phase in the heat transfer liquid storage zone.

Heat transfer liquid may be removed from the heat-receiving zone by removing heat transfer fluid from the heat pipe proper either in the gaseous phase, or in the liquid phase, or in both phases together. In case heat transfer fluid is removed from the heat pipe proper in the gaseous phase, this removal may be accomplished by condensing removed heat transfer fluid in the gaseous phase, and storing the heat transfer fluid in the liquid phase obtained in the heat transfer liquid storage zone. When the heat pipe is in use non-condensable gas (which is defined as a gas that does not condense at the temperatures prevailing during normal operation in any part of the heat pipe) will be removed from the heat pipe proper by the vapor phase of the heat transfer fluid, and non-condensable gas will accumulate in that part of the system which contains the heat transfer liquid storage zone. When heat transfer fluid condenses in the heat transfer liquid storage zone, non-condensable gas will be separated from the contents of the heat pipe proper by the condensed liquid. In case the pressure in the heat pipe decreases (e.g., by increase of heat discharge in the heat-discharging zone, which leads to condensation of an increased amount of heat transfer fluid), due to the pressure of the separated non-condensable gas part or all of the heat transfer fluid present in the liquid phase in the heat transfer liquid storage zone will be transported to the heat pipe proper.

In case heat transfer fluid enters the heat transfer liquid storage zone in the gaseous phase it must be condensed in order to form liquid in the said zone and accordingly heat which is set free during condensation must be removed. In general, this heat will be taken up by the environment of the heat transfer liquid storage zone. If desired, this zone and/or a conduit through which the heat transfer fluid is transported from the heat pipe proper to that zone may be cooled, e.g. with air. It is preferred that the heat transfer liquid storage zone can be cooled with combustion air, which very suitably contains fuel to be combusted.

In case heat transfer fluid is transported in the liquid phase from the heat-receiving zone to the heat transfer liquid storage zone no cooling of the latter zone is necessary at all, although the presence of some cooling equipment (e.g., for air cooling) may be of advantage. The non-condensable gas present in the heat transfer liquid storage zone on top of the heat transfer fluid in the liquid phase facilitates back-transportation of the heat transfer fluid in the liquid phase to the heat-receiving zone when needed.

If desired, additional coling means may be present between the heat-discharging zone and the heat transfer liquid storage zone. These additional cooling means may be cooled with air or with the cooling liquid of the engine. In most cases no additional cooling means will be present, because complicated and costly engineering may be needed.

The heat transfer fluid present in the heat pipe should preferably have a boiling point at atmospheric pressure of up to 400°c. Heat transfer fluids with a higher boiling point at the pressure operating in the heat pipe may give rise to cracking of the fuel, while in most cases heat transfer fluids with very low boiling points are not able to vaporize all the fuel.

The choice of the heat transfer fluid will depend in the general characteristics of the fuel to be employed and in particular the final boiling point of the latter. In liquid form the heat transfer fluid may be a pure substance or mixture such that the freezing temperature lies between 0°C and −100°C. It is to be chemically stable and non-corrosive to the materials of construction used at the operating temperature of the heat pipe and appreciable chemical decomposition or reaction should not occur within a period of several years when within the heat pipe. Examples of suitable heat transfer fluids are 2-octanol, decane, tetralin, and in particular fluids which consist for at least 50%w of water.

In case water-comprising fluids are used they preferably contain a suitable stable anti-freeze material, in order to obtain an acceptable freezing point. Alcohols are very suitable as anti-freeze material, and accordingly very suitable heat transfer fluids substantially consist of a mixture of water and ethylene glycol, or in particular of a mixture of water and methanol and/or ethanol. It will be understood that other compounds, such an anti-corrosion additives and anti-oxidants may be present in the heat transfer fluid in minor amounts.

The non-condensable gas is preferably non-reactive within the heat pipe. Examples of suitable non-condensable gases are air, nitrogen, helium, argon, neon and krypton.

The invention also relates to an internal combustion engine (in particular a spark ignition engine) or a gas turbine which contains a device according to the invention. The device forms part of the inlet system and is arranged therein in such a way that during running when the heat transfer fluid in the heat pipe is at its running temperature, the heat-receiving zone of the heat pipe receives heat from the exhaust system of the engine, and the heat-discharging zone of the heat pipe discharges heat to the fuel which is present in the fuel supply system of the engine. The heat-discharging zone of the heat pipe may be in contact with a section of the fuel supply system where the fuel has not yet been mixed with the combustion air, or with a section of it where the fuel has been mixed with part or all of the combustion air.

In order to keep the amount of noxious ocmpounds in the exhaust gases, which mainly consist of CO, nitrogen oxides ($NO_x$) and hydrocarbons, as low as possible, it is of advantage as discussed above, to run the engine on weak mixtures, or in other words to use an amount of air in excess of the amount needed for the toal combustion of the fuel to $CO_2$ and $H_2O$. By doing so less power is obtained from the engine as compared when running it with optimum amounts of fuel and air. To increase the power output the inlet system very suitably contains a compressor (also called supercharger). This compressor may be present in the system downstream of the point where part or all of the combustion air and the fuel have been mixed, but it is preferred that the supercharger compressed the main air stream before it is mixed with the fuel.

In order to keep the heat pipes as short as possible, it is convenient to locate the part of the inlet system where the fuel and the air are mixed and the part of the inlet system where the fuel is vaporized with the aid of the heat pipe, at the exhaust side of the engine. Preferably substantially above the exhuast system. The heated mixture of vaporized fuel and air is very conveniently passed from there across the engine (e.g. over or alongside the engine) to the point where it is distributed among the cylinders of the engine.

It is of advantage, in order to avoid misfiring with the weak fuel/air mixtures that are preferably used, that near the inlet of each cylinder an adjustable valve for bleeding in air is present.

More than one heat pipe may be used in an inlet system for transporting the heat of the exhaust system to the heat-discharging zone of the heat pipe, from where condensed heat transfer fluid is directly returned to the heat-receiving zone.

The invention is illustrated with the help of the drawings, which represent in a schematical form apparatus according to the invention. It is to be understood that the drawings represent only embodiments of the invention, and no limitations as to the scope of the invention can be inferred therefrom.

In FIG. 1 a closed vessel 1 contains a heat transfer fluid, which is in the liquid phase (hatched) in the heat-receiving zone 2 and in the heat transfer liquid storage zone 3. The heat-receiving zone is heated by hot gas from the exhuast via conduit 4. Owing to this heat supply liquid present in the heat-receiving zone is evaporated and heat transfer fluid in the gaseous phase is forwarded to the heat-discharging zone 5. A mixture of air and fuel to be heated in the heat-discharging zone is supplied via conduit 6. Part of the heat transfer fluid is condensed in the heat-discharging zone and flows back (e.g., by gravitational force or by means of a wick) to the heat-receiving zone 2. In case not all of the heat transfer fluid in the heat-discharging zone 5 is condensed, part of the remaining gas condenses in the heat transfer liquid storage zone 3. Equilibrium will be reached when the amount of heat transfer fluid evaporated in the heat-receiving zone 2 will be substantially equal to the amount of heat transfer fluid condensed in the heat-discharging zone 5. The noncondensable gas present in the system will for the greater part be replaced by the vapor of the heat transfer fluid, and will accumulate in that part of the heat transfer liquid storage zone 7 that is above the heat transfer fluid in the liquid phase in that zone. In case the amount of heat discharged in the heat-discharging zone 5 decreases, the amount of non-condensed heat transfer fluid from this zone increases, and will be transported to and condensed in the heat transfer liquid storage zone 3. In case the amount of heat discharged in the heat-discharging zone 5 increases, the amount of heat transfer fluid condensed will increase, and as the amount of heat transfer fluid in the gaseous phase will accordingly decrease, pressure will drop. Due to the pressure of the non-condensable gas 7 in the heat transfer liquid storage zone 3 heat transfer fluid in the liquid phase will be transported via conduit 8 and via the heat-discharging zone 5 to the heat-receiving zone 2. In the latter zone the surface between the heating means 4 and the heat transfer liquid will increase because the amount of heat transfer liquid increases, and accordingly more heat transfer liquid will evaporate per time unit and be forwarded in the gaseous phase to the heat-discharging zone 5, thus supplying an increased amount of heat to be discharged. In a short time a new equilibrium will be reached.

Similarly in case the heat supply to the heat-receiving zone decreases, and accordingly the amount of heat transfer liquid evaporated in that zone decreases, heat transfer fluid in the liquid state will be transported from the heat transfer liquid storage zone to the heat-receiving zone. According to the invention all the heat transfer liquid in the device is stored in the heat transfer storage zone in the liquid phase when the device automatically functions to vaporize fuel only when at temperatures below running temperature.

In the apparatus additional cooling means 9 may be present between the heat-discharging zone 5 and the heat transfer liquid storage zone 3, but this is by no means necessary.

In FIG. 2, in which the numerals have the same meaning as described for FIG. 1, the heat transfer liquid storage zone 3 is connected to the heat pipe proper by means of conduit 8, which is carried out as a capillary. Cooling means for the heat transfer liquid storage zone are depicted as 10.

In FIG. 3 (in which the numerals have the same meaning as in FIGS. 1 and 2) an embodiment of the invention is given in which two heat transfer liquid storage zones are present, viz. 3 and 12. Heat transfer fluid is forwarded in the liquid form from the heat-receiving zone 2 via conduit 13 to the heat transfer liquid storage zone 12, in which a noncondensable gas 11 is present. Additional cooling means 14 are present for the heat transfer liquid storage zone 12. It will be clear that embodiments which contain only one heat transfer liquid storage zone 12 which is connected with the heat-receiving zone 2 with a conduit 13 (and in which the heat transfer liquid storage zone 3 and conduit 8 are not present) are also feasible.

What is claimed is:

1. In the combination: (1) a combustion chamber-containing apparatus selected from the group consisting of an internal combustion engine and a gas turbine, and (2) a device for vaporizing liquid fuel prior to its introduction into the combustion chamber of said apparatus which device comprises a heat pipe which is in the form of a sealed vessel containing a heat transfer fluid comprising a vaporizable liquid having a boiling point at atmospheric pressure up to 400°C and a non-condensable gas, which heat pipe comprises:
   a. a heat-receiving zone operatively engaging the exhaust system of said apparatus, for heating the heat transfer fluid and vaporizing said liquid with the heat from said exhaust system,
   b. a heat-discharging zone operatively engaging the fuel inlet system of said apparatus for cooling and condensing the heat transfer liquid by transference of heat to said fuel to be evaporated, said heat discharging zone communicating with said heat receiving zone whereby condensed heat transfer liquid is directly returned to said heat receiving zone, and,
   c. at least one heat transfer liquid storage zone in communication with the heat receiving zone or the heat discharge zone for storage of the heat transfer liquid,
   the improvement comprising that the capacity of said storage zone is sufficient to store all of the heat transfer liquid and a portion of the non-condensable gas present in the device.

2. A device combination to claim 1, in which the device heat transfer liquid storage zone is in poor thermal contact with the heat-receiving zone and the heat-discharging zone of the heat pipe.

3. A device combination to claim 1, in which the device heat transfer liquid storage zone operatively engages the air inlet system of apparatus engine for cooling the heat transfer fluid contained therein.

4. A device combination to claim 1, in which the device heat transfer liquid consists of at least 50%w of water.

5. A device combination to claim 1, in which the device heat transfer fluid contains an alcohol.

6. A device combination to claim 4, in which the device heat transfer fluid substantially consists of a mixture of water and ethylene glycol.

7. A device combination to claim 5, in which the device heat transfer fluid substantially consists of a mixture of water and methanol and/or ethanol.

* * * * *